United States Patent [19]

La Warre, Sr.

[11] 4,382,493
[45] May 10, 1983

[54] DISC BRAKE ASSEMBLY

[76] Inventor: Robert W. La Warre, Sr., P.O. Box 35, Lima, Ohio 45802

[21] Appl. No.: 194,855

[22] Filed: Oct. 7, 1980

[51] Int. Cl.³ .......................................... F16D 55/224
[52] U.S. Cl. ............................. 188/73.43; 188/73.35; 308/DIG. 8; 308/DIG. 9; 308/241
[58] Field of Search .............. 188/73.33, 73.34, 73.35, 188/73.36, 73.43, 73.44, 73.45; 308/DIG. 8, DIG. 9, 241

[56] References Cited

U.S. PATENT DOCUMENTS

| Re. 28,354 | 3/1975 | Orkin | 308/241 X |
| 1,306,690 | 6/1919 | Gillespie | 308/241 |
| 1,975,105 | 10/1934 | Keller et al. | 308/241 |
| 2,743,221 | 4/1956 | Seaford | 204/58 |
| 2,905,600 | 9/1959 | Franklin | 204/58 X |
| 3,612,227 | 10/1971 | Schaftner et al. | 188/73.35 X |
| 3,782,509 | 1/1974 | Cook et al. | 188/73.36 X |
| 3,910,385 | 10/1975 | Gardner | 188/73.36 X |
| 3,929,389 | 12/1975 | Riegler et al. | 308/DIG. 8 |
| 4,046,234 | 9/1977 | Kurata | 188/73.43 |
| 4,141,436 | 2/1979 | Meyer | 188/73.45 X |

FOREIGN PATENT DOCUMENTS 2017236  10/1979  United Kingdom ............ 188/73.36

Primary Examiner—George E. A. Halvosa
Attorney, Agent, or Firm—Murray & Whisenhunt

[57] ABSTRACT

An improvement in a disc brake assembly is provided. The assembly includes: a rotatable disc; a caliper; an anchor frame for securing the said disposition of the caliper; a keyway between the caliper and an adjacent surface of the anchor frame; a key disposed in the keyway for providing lateral sliding movement between the caliper and the key; and a caliper support spring between the key and the caliper for supporting the caliper on the key. In the improvement, the key has a surface hardness of at least 62 and is configured such that the full compression force of the support spring is at least 6 g's and less than 9 g's and the effective sliding friction between the caliper and the key is decreased. With this improvement accumulated rust between the key and the caliper sliding surfaces is reduced and the caliper is more freely slideable on the key. The key is made of, or coated with, a non-corrosive material.

20 Claims, 6 Drawing Figures

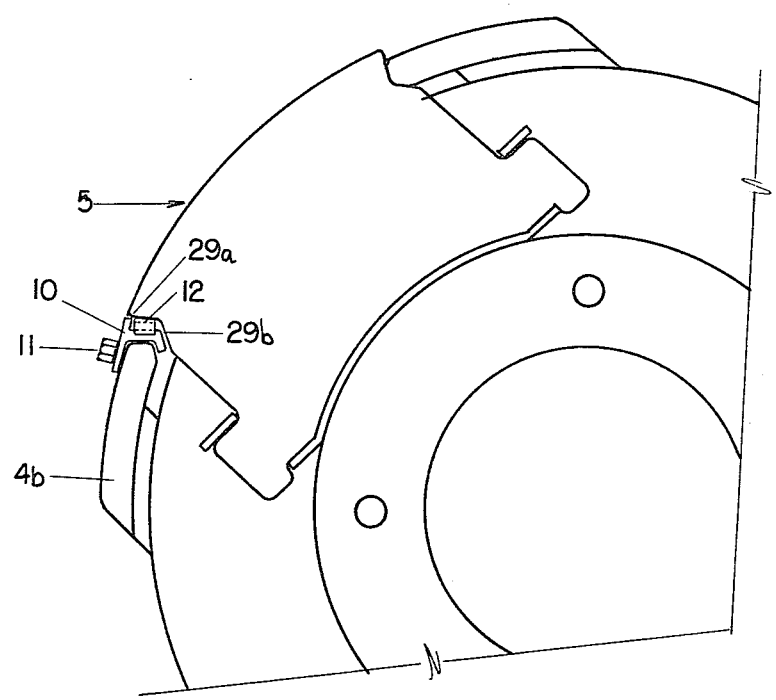
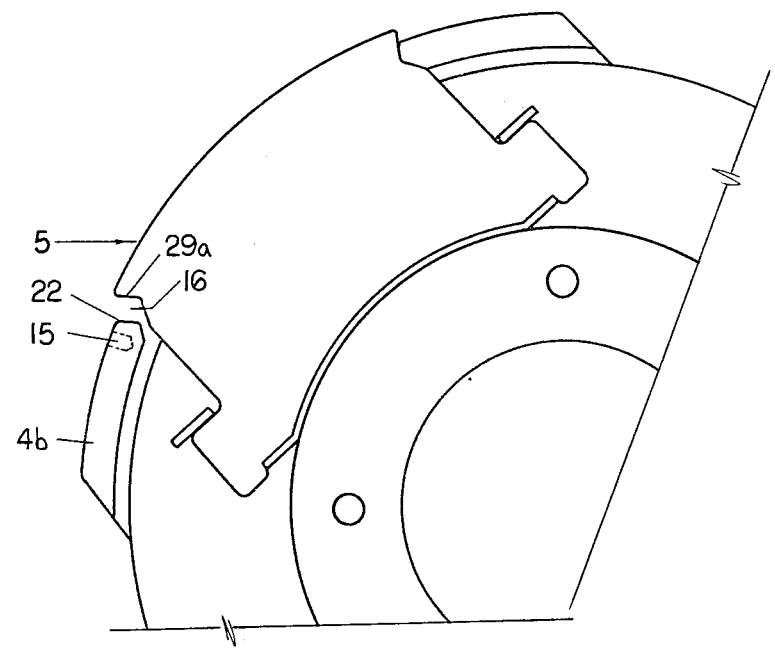

DISC BRAKE ASSEMBLY

The present invention relates to improvements in conventional disc brake assemblies, and, more particularly, to such improvements wherein conventional assemblies have a reduced incidence of rusting, galling and binding in the sliding surfaces between the caliper of the disc brake and the support for that caliper.

BACKGROUND OF THE INVENTION

In conventional disc brake assemblies for wheeled motor vehicles, a vertically disposed disc is rigidly attached to the wheel to be braked and a caliper is disposed about that disc so that braking surfaces, held by the caliper, are moveable towards opposite vertical sides of the disc. As a part of the caliper, at least one fluid operated piston, e.g. hydraulic or air, exerts pressure on the braking surfaces to move those braking surfaces into engagement with the disc. The fluid operated piston is provided with pressurized fluid via convenient mechanical devices, such as foot pedals and the like. The caliper is secured to an iron anchor frame, which is rigidly attached to the support for the wheel to be braked. A keyway is provided, which is defined by sliding surfaces on the caliper, a caliper recess, and an adjacent surface of the anchor frame. A key is disposed in that keyway. The key is fixedly attached to the anchor frame and the key has surfaces for providing lateral sliding movement between the caliper sliding surfaces and the key sliding surfaces and for providing a positive lock against substantially vertical displacement of the caliper from the key. A caliper support spring is disposed between the key and a surface of the caliper recess for resiliently and slideably supporting the caliper sliding surfaces on the key sliding surfaces. That support spring is of a configuration such that when disposed within the keyway a vertical force of about 12–14 g's on the caliper is required for the caliper to fully compress the spring, which provides an effective filler or spacer between the caliper sliding surfaces and the key sliding surfaces.

Thus, when fluid pressure is applied to the piston in the caliper, the braking surfaces are engaged with the disc of the wheel to be braked and the caliper slides laterally on the key. By such sliding, the braking surface, opposite to the braking surface engaged by the piston, is moved into contact with the opposite surface of the disc at the same time the braking surface operated by the piston is moved into braking engagement with the disc.

In conventional disc brakes, no positive means are provided for moving the braking surfaces away from the disc, once the fluid pressure on the piston has been released. The design of these conventional brakes intends that normal road vibrations will be transmitted to the disc in the form of lateral amplitudes and such vibrations will cause braking surfaces are disengaged from the disc.

Also, in most conventional disc brakes, especially for automobiles, all of the anchor frame, caliper, key, and key support springs are made of iron or at least ferrous metals. During use of the disc brakes, water and atmospheric corrosive materials can collect on the above noted sliding surfaces of the caliper, the key, and the caliper support spring. Over a period of time the ferrous metals of the caliper, key, and support spring begin to rust. An accumulation of galling or binding rust between the key sliding surfaces, the caliper sliding surfaces or the support spring continues to increase and the frictional resistance to the sliding of the caliper on the key, i.e. the "effective sliding friction", correspondingly increases. This increase in resistance to the caliper sliding on the key, is not of substantial concern in applying the brakes, since, typically, the piston in the caliper will exert two or more tons of pressure on the caliper. Thus, that exceedingly high pressure is quite capable of sliding the caliper into braking engagement, even though substantial galling and binding rust has accumulated. However, since no positive means are provided for disengaging the braking surfaces once the fluid pressure on the piston has been released, the frictional resistance can become so great that normal road vibrations are insufficient to disengage the braking surfaces. The pressure of this retained engagement will be considerably less than the pressure exerted during braking, but nevertheless that retained pressure on the braking surfaces is quite substantial.

This retained pressure on the braking surfaces results in two most unwanted occurrences. First of all, the friction between the engaged braking surfaces and the disc generates substantial heat which can damage both the disc and the braking surfaces and can result in the brake becoming substantially unoperable or at least the efficiency thereof substantially reduced. Secondly, the friction caused by the retained engagement of the braking surfaces substantially increases the power required to drive the motor vehicle, with a considerable reduction in fuel efficiency.

The foregoing problem is accentuated by the caliper support spring. Since the caliper in conventional disc brakes may be relatively heavy, e.g. from 4 to 15 pounds, a considerable vertical force, measured in g's, is exerted on the caliper with vertical movement of the wheel. For example, if the wheel encounters a pothole, with rapid vertical up and down movement, the force exerted on the caliper may be in the range of 5 to 8 g's, depending upon severity of the pothole. In extreme vertical movement of the wheel, such as the wheel running over ties of a railroad track, the vertical force exerted on the caliper can reach 9 g's or more, and in some cases as high as 10 to 12 g's.

Thus, the typical caliper support spring is designed such that the vertical force on the caliper required for the caliper to fully compress the support spring is at least 12 g's, and more usually 12 to 14 g's. With such a support spring, the brake is capable of passing over severe irregularities in the road without causing a clanking sound which would otherwise result when the caliper under high g loads forceably strikes the key.

However, the force of the support spring, being a frictional normal force between the key and the caliper, increases the frictional resistance, i.e. "effective sliding friction", noted above, and with galling or binding rust accumulation, the effective sliding friction between the caliper and key can rapidly become greater than the force provided by road vibration for moving engaged braking surfaces away from the disc.

As noted above, the support spring provides an effective filler or spacer between the caliper sliding surfaces and the key sliding surfaces. The intended clearance between the caliper sliding surfaces and the key sliding surface is generally in the range of 50–70 mils, i.e. only about a 20 mil variation in dimensional tolerance. However, due to manufacturing tolerances in producing disc brakes, that clearance can easily range between 40 and 100 mils. In order to compensate for this range of dimensional tolerance encountered in normal manufacture, the support spring must have the above noted relatively large g compression factor. With this higher g compression factor, the spring can accommodate variable manufacturing dimensional tolerances considerably greater than those intended. This distance is important from a safety point of view, since the spring is required to securely engage the caliper, in a slideable manner, with the key mounted on the anchor frame and to prevent substantial displacement of the caliper from the key in a generally vertical direction. If this distance between the caliper and the key is too great, it is possible for the caliper to rotate, in the vertical direction, off of the key especially in the event of spring failure and ensuing loss of spring, and cause considerable damage to the vehicle on which the brake is mounted, as well as be the cause of a serious accident. The relatively large g compression factor of the spring, thus, serves to insure that the caliper will not be rotated off of the key.

With heavy support springs, of the fore-going nature, i.e. large g loads for full compression, between the caliper sliding surface and the key sliding surface, the "effective sliding friction" between the caliper sliding surface and the key sliding surface is considerably increased. In some cases, where manufacturing tolerances result in close clearance between the caliper sliding surface and the key sliding surface, e.g. 40 mils or less, the disposition of the heavy support spring therebetween can increase the "effective sliding friction" to that which will prevent disengagement of the brake pads by normal road vibration, even in the essential absence of rust and contamination, e.g. on a new brake. This further accentuates the problem noted above...

The above noted problems, in general, have been recognized by the art, but the specific causes for those general problems have heretofore eluded the art. For example, one approach in the art to avoid the overall problem, i.e. binding of the sliding surfaces of the key and the caliper, is by protecting those sliding surfaces from intrusion of moisture and atmospheric contamination, including dirt, dust and the like. These protecting devices, are generally referred to as dust covers, although they function in manners other than covers, particularly in special brake designs. Representative of such approaches in various brake designs are U.S. Pat. Nos. 3,997,032; 4,084,666; and 4,162,721.

Another approach in the art is that of providing some degree of corrosion resistance to sliding parts in the disc brake, with or without additional protection such as dust covers. For example, U.S. Pat. No. 4,046,234 suggests placing a thin sheet of corrosive resistant metal, such as stainless steel, on sliding surfaces between a fixed portion of the brake (e.g. the frame) and the caliper body.

U.S. Pat. No. 4,189,032, recognizes the problem of rusting between the sliding surfaces, and further recognizes that the rusting problem can be mitigated by providing large clearances between those sliding surfaces. However, as that patent points out, such large clearances produce noisy brakes due to the "clunk" which occurs, for the reasons noted above. That patent suggests that the key and keyway be replaced by a pin within a bore, in order to protect the pin from the elements. To further protect the pin from the elements, that patent suggests a dust cover (or boot), as well as providing a non-corrosive bushing, e.g. brass, in the bore and a non-corrosive pin, e.g. stainless steel. However, this approach is considerably more expensive than the conventional disc brake design, described above, particularly in that the bore, bushing and pin must be very accurately manufactured. In addition, since the clearance between the bushing and pin must be quite small, for operation of the pin type brake, any failure of the dust cover which would allow contaminates to enter between the bushing and pin can cause considerable difficulty in operation of the brake. Further, in this arrangement, since the caliper will not "float" and with a key and keyway arrangement, it has no ability to compensate automatically for slight warping of the disc or for any lack of parallelism between the axis of the disc and the direction of the caliper sliding along the keyway.

In order to retain the advantage of the "floating" caliper disc brake, for the reasons noted in the foregoing paragraph, another approach to the problem is that of providing specially configured keys. Thus, U.S. Pat. No. 4,109,764, suggests a generally V-shaped cross-section key with a cylindrical surface on one arm of the V. This arrangement is said to permit slight pivoting of the caliper relative to the fixed member, e.g. a type of "floating" action, while discouraging penetration by impurities to the sliding surfaces. A variety of other special key designs are known to the art, but these key designs, in general, restrict the "floating" movement of the caliper on the anchor frame and in a more limited regard suffer from the same disadvantages of the pin approach, discussed above. Further, in general, these special key designs require more intricate machining of the parts of the caliper and anchor frame, as well as more complicated and expensive key designs.

Another approach, somewhat similar to the foregoing, is that of providing special torque members, such as disclosed in U.S. Pat. No. 4,134,477, but here again, this approach considerably increases the cost of the disc brake.

Accordingly, the problem described above has never been adequately solved, in that prior art approaches have either considerably increased the cost of the brake or have resulted in restriction of the "floating" action, which "floating" action is quite considerable in disc brakes. It would, therefore, be of considerable advantage in the art to provide a solution to this problem, which neither substantially increases the cost of the brake nor significantly reduces the "floating" action of the brake. It would be a further advantage to the art to provide this solution such that it can be applied to the original manufacture of brakes or to the repair of existing brakes. This latter consideration is of considerable importance, bearing in mind the very large number of brakes now in service which suffer from that problem.

OBJECTS OF THE INVENTION

It is therefore an object of the present invention to provide a disc brake assembly for wheeled motor vehicles wherein the problem of galling or binding rust between the key and caliper sliding surfaces is eliminated. It is a further object of the invention to provide such assembly which can be placed into manufacture without substantial changes in present manufacturing procedures and which require no complex machining or manufacture of caliper sliding surfaces and keys. It is a further object of the invention to provide such brake assembly which can be utilized in the original manufacture of the brake or which can be placed into existing brakes with only a relatively minor amount of time and effort. Other objects will be apparent from the following detailed description and the claims.

BRIEF DESCRIPTION OF THE INVENTION

The present invention is based on three primary discoveries. First of all, it was discovered that a major contribution to the galling or binding rust induced increased frictional resistance is the consequential scoring of the key by that rust. As the key scores, not only is the frictional resistance increased, but fresh virgin areas for rust are produced, which accelerates the rusting problem. To avoid that problem, according to a feature of the present invention, the key is produced of a material, or with a coating thereon, wherein the hardness of the key is substantially increased, as opposed to the hardness of conventional keys. By so doing, any impurities and the like which accumulate in the keyway and on the key will score the key considerably less than the scoring which would occur in conventional keys.

A second discovery is that the force to fully compress the support spring can be substantially reduced from that conventionally used in brakes of this type and such reduction in that force (a frictional normal force) measurably decreases the "effective sliding friction" between the caliper sliding surfaces and the key sliding surfaces. This reduction in the force to fully compress the support spring can be achieved either by reducing the natural force of the spring or relieving the sliding surfaces of the key whereby the distance between the key and the caliper sliding surface is increased, both of which decreases the "effective sliding friction". When the effective sliding friction is decreased, impurities, rust and the like can be considerably more easily expelled from the keyway and avoid the degrading results of that accumulation.

The two foregoing features will substantially mitigate the binding and galling rust induced frictional resistance, but as a further important feature of the invention, the material of the key and/or a coating thereon, is made of a non-corrosive material, consistent with the hardness noted above, and more preferably, the non-corrosive key is covered with a high temperature grease, which not only decreases the effective sliding friction, but further protects against galling and the undesired effects of impurities.

Thus, briefly stated, the present invention is concerned with a disc brake assembly for wheeled motor vehicle. The brake assembly has a vertically disposed rotatable disc. An iron caliper is disposed about the disc so that braking surfaces are provided next to opposite vertical sides of the disc. An iron anchor frame is provided for securing said disposition of the caliper. A keyway is defined by sliding surfaces on the caliper, a caliper recess and an adjacent surface of the anchor frame. An iron key is disposed in the keyway and fixedly attached to the anchor frame. The key has surfaces for providing lateral sliding movement between the caliper sliding surfaces and the key sliding surfaces and for providing a positive lock against substantial vertical displacement of the caliper from the key. An iron caliper support spring is disposed between the key and the surface of the caliper recess for resiliently and slideably supporting the caliper sliding surfaces on the key sliding surfaces. The support spring is of a configuration such that when disposed within the keyway, a vertical force of at least 12 g's on the caliper is required for the caliper to fully compress the spring. The configuration of the keyway, key and support spring all affect the "effective sliding friction" between the caliper sliding surfaces and the key sliding surfaces.

The present improvement in that brake assembly is where the key has a sliding surface hardness of at least 62 on the Rockwell C scale, and one or more of the key, keyway and support spring are so configured such that the full compression force of the support spring is at least 6 g's but less than 10 g's whereby the effective sliding friction between the caliper sliding surfaces and the key sliding surfaces is decreased.

By this arrangement, the accumulation of galling or binding rust between the key sliding surfaces, the caliper sliding surfaces or the support spring is reduced and the caliper is more freely slideable on the key. More preferably, the key, or coating thereon, not only has the above noted hardness, but is of a substantially non-corrosive nature. Even more preferably the key, and optionally the caliper sliding surfaces, as well as the support spring, are coated with a high temperature, anti-corrosive grease.

BRIEF DESCRIPTIONS OF THE DRAWINGS

FIG. 2 is a side view of a portion of FIG. 1.

FIG. 3 is the same side view as FIG. 2, except that the key and support spring are removed for clarity.

DETAILED DESCRIPTION OF THE INVENTION

Figure 1:
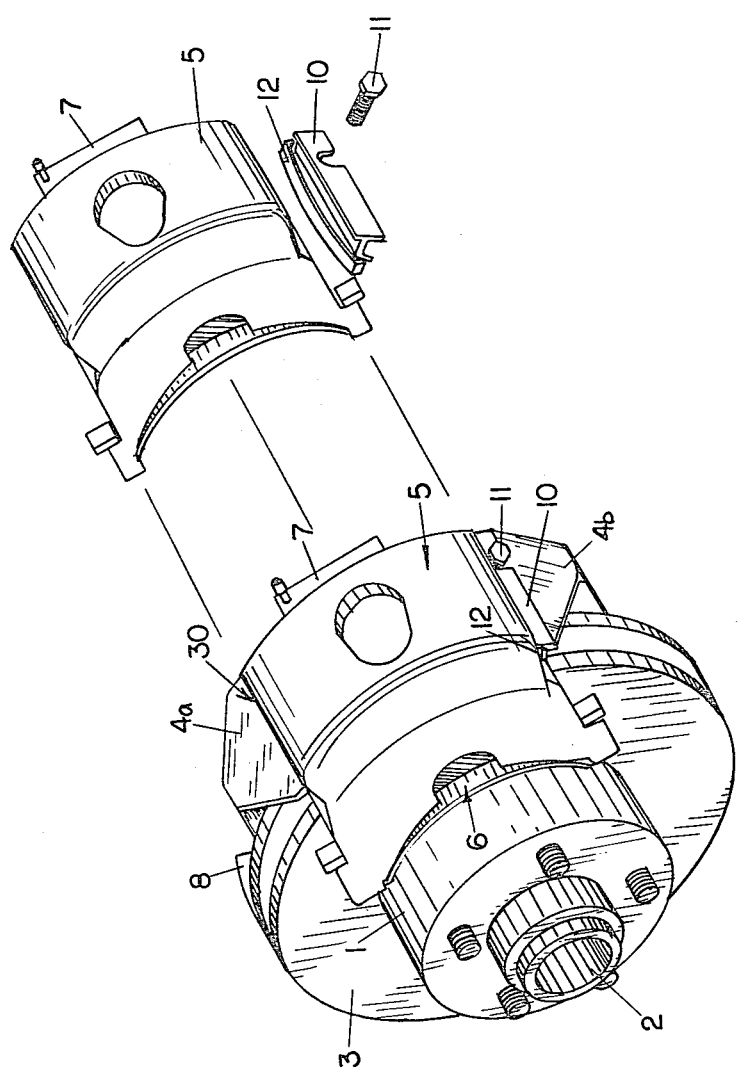
FIG. 1 is a perspective view of a typical brake assembly of the "floating" type, with a partially exploded view of the caliper, support spring and key.

The overall brake assembly of the invention can best be understood by reference to FIG. 1, which shows a typical "floating" brake assembly, with the caliper, support spring and key shown in an exploded view. The hub and rotor assembly 1, fits over hub 2, and is provided with a braking disc 3. Rigidly attached to the support for the hub and rotor assembly, e.g. the spindle, are anchor frames 4a and 4b. The caliper assembly generally 5 houses a pair of brake pads and lining assemblies 6 (the inner brake pads and lining assembly not shown), as well as a piston assembly 7. A dust shield 8 is usually disposed on the inner portion of the brake assembly.

Key 10 is fixedly attached to anchor frame 4b by key retainer screw 11 and disposed between the key and the caliper is caliper support spring 12.

FIG. 2 shows a partial side view of the brake assembly of FIG. 1. This figure shows more clearly the assembly of the caliper 5, key 10, retainer screw 11 and caliper support spring 12.

FIG. 3 is the same as FIG. 2, but with the key, key retainer screw and caliper support spring being removed. This figure shows the threaded bore 15 for receiving the key retainer screw 11. It also shows the overall clearance, generally 16, between the caliper 5 and the anchor frame 4b. Of course, this clearance is materially reduced by the insertion of key 10 and caliper support spring 12.

Figure 4:
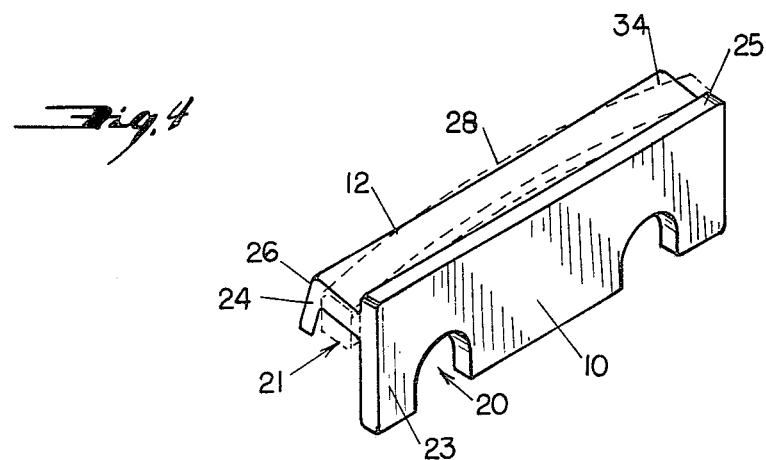
FIG. 4 is a perspective view of a key useful in the present invention.
Figure 5:
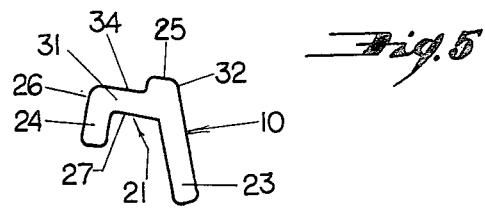
FIG. 5 is an end view of that key.
Figure 6:
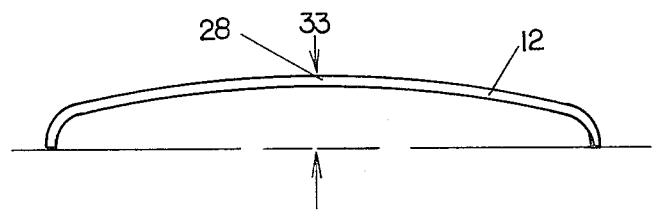
FIG. 6 is a side view of the support spring.

FIG. 3 shows a perspective view of a typical key useful in the present invention, with the caliper support spring placed in its usual position thereon (the support spring shown in phantom lines for clarity). An end view of the key is shown in FIG. 5. A side view of a typical caliper support spring is shown in FIG. 6. Referring to FIGS. 4, 5 and 6, the key 10 may have one or more aperatures 20 for passing retainer screw 11 and fixedly attaching key 10 to anchor frame 4b (two aperatures 20 being provided for left and right side wheels). A recess, generally 21, is configured so that key 10 fits over the uppermost portion 22 of anchor frame 4b (see FIG. 3). Outside leg 23 of the key mates with the outside surface of upper portion 22 of anchor frame 4b and inner leg 24 mates with the inside of upper portion 22 of anchor frame 4b. Thus, key 10 provides a major sliding surface 26 which mates with respective major caliper sliding surface 29b in the recess in the caliper (see FIG. 2). In addition, and depending upon how rigidly key 10 is fixed to anchor frame 4b, some sliding may take place between the uppermost portion 22 of anchor frame 4b and the underside 27 of key 10. In addition, since support spring 12 also contacts the inner surface 29a of the recess in the caliper (see FIG. 2), its uppermost portion 28 may also slide relative to the recess in the caliper. This sliding action is that which is primarily used in adjusting for pad wear. Some sliding is also achieved between the ends of spring 12 and the ends of key 10 where the spring contacts the key. The sliding action between the key and caliper is the primary sliding action during braking.

As noted above, one feature of the present invention is to provide a key with a surface hardness of at least 62 on the Rockwell C scale. Further, as explained above, this increased hardness materially contributes to the mitigation of scoring and additional rusting. More preferably, however, that surface hardness of the key is at least 64 and more preferably at least 68. With special coatings on the key, surface hardnesses of at least 70 or above may be achieved. Such coatings may be on the entire key or may be only on the sliding surfaces of the key. In any event, that surface coating must be at least on the sliding surfaces thereof, i.e. 26 and the ends of 34 where contact with the support spring 12 is made.

While a variety of coatings for metals are known to the art which can provide surface hardnesses of this nature, generally speaking, the coating will be either a ceramic coating or a metal coating, and more preferably that coating will be a substantially non-corrosive coating. Ceramic coatings do have a tendency to be brittle, and for this reason non-corrosive metal coatings are preferred. Electrolytic metal coatings are specifically preferred, since these coatings can be easily and accurately applied. .

As an example of the foregoing, in a preferred embodiment of the invention, the key is made of a hard alloy aluminum (which is known to the art) and is coated with a coating of electrolized and anodic aluminum. However, in order to achieve the hardness required by the present invention, the anodic aluminum coating must be of the so-called "hard-coat anodizing"-type. Processes for making "hard-coat anodizing"-type coatings are known to the art and are generally referred to as the Martin Process, Sanford Process, and Alumilite Process. See, for example, U.S. Pat. Nos. 2,743,221; 2,897,125; 2,905,600; 2,977,294; and 3,020,312. It is preferred that these coatings have a thickness of at least 1 mil., but ideally the thickness will be at least 2 mils. and usually from 4 to 6 mils. These coatings can also be improved by placing trace amounts of copper in the electrolizing solution, as by way of copper sulfate. Such coatings can produce surface hardnesses on the coated key of at least 75.

Alternatively, the metal coating may be a chromium coating, and with such coatings surface hardnesses of at least 68 and up to about 80 to 85 can be easily realized.

In lieu of such coatings, or in combination therewith, the key may be made of a substantially non-corrosive, non-ferrous metal. For example, the key may be made of carballoy or work hardened bronze, both of which will give surface hardnesses of at least 65 and up to about 85.

By providing keys of the foregoing nature, binding and galling rust is either essentially eliminated or substantially reduced. It will be appreciated, however, that even with a key of this nature, the conventional iron support spring and iron caliper are capable of rusting, with galling or binding. However, since the key will not corrode and is of the hard characteristic described, the binding or galling rust generated by the support spring and caliper can be effectively cleared or rendered essentially innocuous by the present key.

It will also be appreciated that instead of the key being made of a non-corrosive, non-ferrous hardened material, at least at its sliding surfaces, any one or more of the key, the support spring and the caliper sliding surfaces may be made of such material. However, if the sliding surfaces of the caliper is made of this material, then considerably more effort must be expended, since either the sliding surfaces of the caliper must be carefully coated or the entire caliper must be made of that material, which would normally be far too expensive. If the spring, alone, is made of such material, then the chance for galling and binding rust between the sliding surfaces of the key and the caliper still exists. The non-corrosive support spring would help mitigate the problem, but in and of itself it is not normally sufficient. Accordingly, it is greatly preferred that at least the key be made of the non-corrosive non-ferrous hardened material, as described above. This is also the simplest element to make of this material.

The effective sliding friction between the sliding surfaces of the disc brake can also be materially improved by coating those sliding surfaces with a high temperature grease. In this regard, high temperature grease means that it has a flow temperature of at least 400° F. The grease may be disposed on one or more of the key sliding surfaces, the key, the caliper sliding surfaces, the keyway and the support spring. In addition, it may be disposed on the mating surfaces between the upper anchor frame 4a and the upper mating portion of caliper 5, generally in the area 30 (see FIG. 1).

In order for the grease to be effective for longer periods of time, however, the grease must have special properties, even aside from the high flow temperature noted above. It must be capable of remaining in and on the sliding surfaces without being extruded therefrom due to sliding pressures. To achieve this result, the grease should be a metal filled grease, i.e. filled with metal microspheres. These microspheres, preferably, will be of a non-corrosive non-ferrous material such as aluminum microspheres. The grease, also, will normally have anti-corrosion inhibitors therein and stabilizers to provide a high pressure grease. Greases of this nature are known to the art, but they have not been suggested for the present purposes. .

Again referring to FIG. 5, the thickness of lateral leg 31 of key 10 can vary with the particular key configuration and caliper design. It will be appreciated that the combination of the depth of the recess 21 in the caliper, and the thickness of lateral leg 31 all combine with the specific configuration and depth 33 of support spring 12 (see FIG. 6) to affect the effective sliding friction in the keyway. This sliding friction can be decreased by relieving lateral surface 34 of key 10. For every mil of relief of that surface, a corresponding increase of 1 mil in the clearance is provided. For most applications, that surface may be relieved at least 5 mils without any noticeable change in operation of the brake. Indeed, that surface may be relieved up to 50 mils, e..g. up to 30 mils and still provide a safe brake when the inside leg 24 and abutment 25 remain in the same configuration, since that leg and abutment will effectively lock the caliper from vertical rotation. A similar increase in clearance can be achieved by relieving sliding surface 26. By thus relieving one or both of sliding surfaces 26 and 34, a reduction in the effective sliding friction is achieved. Of course, by the term "relieving" is meant, also, to reduce the thickness of the sections of 31 and 24, which in turn can be achieved by increasing the size of recess 21.

From the foregoing, it will be appreciated that by relieving the key sliding surface next to the support spring by the same amount, i.e. up to 50 mils, e.g. up to 30 mils but at least 5 mils, the g's to fully compress a conventional support spring will be correspondingly reduced. However, it has been found that the g's for full compression of the support spring should not be less than 6 g's nor more than 10 g's. If the force is greater than 10 g's the desired rust accumulation displacement and redistribution of high temperature grease (discussed more fully hereinabove) will not be achieved. If the force is less than 6 g's, the brake will become unacceptably noisy. The optimum g's is that when after a hard reverse direction brake is made, a light click is heard when the brake is released. This reduction in the g's force will produce some additional noise over very rough surfaces, but this increase in noise is usually not noticeable over the surface noise transmitted through the suspension of the vehicle. Furthermore, 6 g's force is quite sufficient for safety purposes.

It will also be appreciated that in connection with the manufacture of such brakes, the same decrease in effective sliding friction may be achieved by relieving by the same amount surface 22 of anchor 4b (see FIG. 3) or the corresponding surface of anchor 4a (see FIG. 1).

From the foregoing, it will be easily appreciated that the present invention is just as applicable to the modification of existing brake assemblies as it is to the manufacture of original brake assemblies. All that is required to modify existing brake assemblies on a priorly driven motor vehicle is to remove the conventional iron key therefrom, in the manner well known to any mechanic, and replace that key with the key of the present invention, i.e. a key which at least has the present hardened surface and relieved in the manner described above to decrease the effective sliding friction. Thus, by replacing one key, major features of the invention can be achieved in existing brakes. On the other hand, the effective sliding clearance could be achieved by replacing the conventional iron key with a key of a configuration or thickness which likewise decreases the effective sliding friction, but this is less effective and still requires a new hardened key. It is, of course, possible to mill out the recess in the caliper to decrease the effective sliding friction, but this would ordinarily be too expensive to perform on existing brakes. Further, since in any modification of an existing brake, a new key must be used, i.e. one with a harder surface, it is preferred that the effective sliding friction be reduced by way of relief of surface 34 and, desirably surface 26 since this can be easily achieved in producing the key for replacing the iron key on existing brakes.

The following example will illustrate an embodiment of the invention, but it is to be understood that the invention is not limited to this example, but extends to the scope of the foregoing disclosure and following claims.

EXAMPLE

A 1979 van equipped with Bendix single piston sliding caliper disc brakes on the front wheels was examined for freeness of action of the caliper assembly. It was found that the keyway had considerable rust therein and binding and galling friction occurred. With the van jacked off the ground and the wheel removed, a torque wrench was attached to one of the lugs of the wheel and it was determined that it required approximately 50 inch-lbs. of torque to move the rotor within the disc pads. The binding and galling friction, which prevented separation of the pads from the disc by normal road vibrations, also caused excessive heat build-up in the pads and on the disc and the van experienced poor fuel efficiency.

The key retainer screw was removed but the key and caliper support spring were so encrusted with rust that they could not be removed other than by forcing the key and spring from the keyway by means of a punch and heavy hammer. After cleaning the upper and lower anchor frames, a high temperature grease (flow point about 2,000° F.) stabilized for high pressure and containing microspheres of aluminum was applied to the upper and lower mating surfaces of the anchor frame. The same grease was applied to the caliper sliding surfaces and the recess in the caliper, as well as to a new iron caliper support spring.

A key according to the present invention, as described below, also had that grease applied to the surfaces which contact the lower anchor frame, as well as the sliding surfaces thereof. The caliper was repositioned on the anchor frames and the key and support spring could be easily placed in the keyway with only thumb pressure.

The reassembly was completed by tightening the key retainer screw and the torque to turn the wheel was measured. That torque was approximately 3 inch-lbs. The wheel moved freely, and in operation there was no excessive heat build-up in the disc or the disc pads. The fuel efficiency improved by about 20%.

The key used in the assembly had essentially the same configuration as the original equipment key, with the exception that the sliding surface 34 of the key had been relieved by 20 mils, thereby decreasing the effective sliding friction. The key was made of 6061-L hardened aluminum and was coated with approximately 5 mils of hard-coat anodizing, anodic coating placed on the key by the known Martin Process, with the exception that trace amounts of copper by the way of copper sulfate, were utilized in the electrolizing bath. The surface hardness of the key was approximately 80 on the Rockwell C scale.

Having described the invention, it will be apparent to those skilled in the art that modifications thereof may be easily achieved. Thus, those modifications and variations are intended to be embraced by spirit and scope of the annexed claims.

I claim:

1. In a disc brake assembly for wheeled motor vehicles including: a vertically disposed rotatable disc; a caliper disposed about the disc so that braking surfaces were provided next to opposite vertical sides of the disc; an anchor frame for securing the said disposition of the caliper; a keyway defined by sliding surfaces on the caliper, a caliper recess and an adjacent surface of the anchor frame; an iron key disposed in the keyway and fixedly attached to the anchor frame, said key having surfaces for providing lateral sliding movement between the caliper sliding surfaces and the key sliding surfaces and for providing a positive lock against substantial vertical displacement of the caliper from the key; and an iron caliper support spring disposed between the key and a surface of the caliper recess for resiliently and slideably supporting the caliper sliding surfaces on the key sliding surfaces, said support spring being of a configuration such that when disposed within the said keyway that a high vertical force on the caliper is required for the caliper to fully compressing the spring; whereby an effective sliding friction between the caliper sliding surfaces and the key sliding surfaces results from the configurations of the keyway, key and support spring;

the improvement wherein the said key has a sliding surface hardness of at least 62 on the Rockwell C scale and one or more of the keyway, key and support spring are so configured such that the said full compression force of the spring is at least 6 g's and less than 10 g's and the effective sliding friction between the caliper sliding surfaces and the key sliding surfaces is decreased, whereby, the accumulation of galling or binding rust between the key sliding surfaces, the caliper sliding surfaces or the support spring is reduced and the caliper is more freely slideable on the key.

2. The assembly of claim 1 wherein the said hardness of the key is at least 64.

3. The assembly of claim 1 wherein the said hardness of the key is at least 68.

4. The assembly of claim 1 wherein the said hardness is at least 70.

5. The assembly of claim 1 or 2 or 3 or 4 wherein the surface hardness is provided by a coating on the said key, at least on the sliding surfaces thereof.

6. The assembly of claim 5 wherein the coating is a ceramic coating or a metal coating.

7. The assembly of claim 6 wherein the coating is substantially non-corrosive metal coating.

8. The assembly of claim 7 wherein the metal coating is an electrolytic coating.

9. The assembly of claim 8 wherein the key is made of hardened aluminum and the coating is a coating of electrolized anodic aluminum alloy.

10. The assembly of claim 9 wherein the surface hardness of the coated key is at least 75.

11. The assembly of claim 8 wherein the metal coating is a chromium coating and the surface hardness is at least 68.

12. The assembly of claim 1 wherein the key is made of a substantially non-corrosive, non-ferrous metal.

13. The assembly of claim 12 wherein the key is made of carballoy or work harded bronze and the surface hardness is at least 65.

14. The assembly of claim 1 wherein a grease having a flow temperature of at least 400° F. is disposed on one or more of the key sliding surfaces, the key, the caliper sliding surfaces, the keyway and the support spring.

15. The assembly of claim 14 wherein the grease is a metal filled grease.

16. The assembly of claim 15 wherein the metal is in the form of aluminum microsphere.

17. The assembly of claim 14 wherein the grease is an anti-corrosion and high pressure grease.

18. The assembly of claim 1 wherein one or more the key, the support spring and the caliper sliding surfaces are made of a non-corrosive, non-ferrous metal.

19. The assembly of claim 1 wherein one or more of the key, the caliper sliding surface or the caliper support spring has at least part of the mating surfaces thereof relieved, by at least 5 mils so that the effective sliding friction is decreased.

20. The assembly of claim 19 wherein the key sliding surface is relieved by between 5 and 30 mils.

* * * * *